United States Patent [19]

Oprins

[11] 4,070,930
[45] Jan. 31, 1978

[54] WIRE STRIPPER
[75] Inventor: John A. E. Oprins, Sycamore, Ill.
[73] Assignee: Ideal Industries Inc., Sycamore, Ill.
[21] Appl. No.: 720,202
[22] Filed: Sept. 3, 1976
[51] Int. Cl.² .............................................. H02G 1/12
[52] U.S. Cl. .................................... 81/9.5 B; 30/90.6
[58] Field of Search ............ 30/90.6; 81/9.5 R, 9.5 B, 81/428 R, 302; 24/137 A, 253

[56] References Cited
U.S. PATENT DOCUMENTS

| 888,606 | 5/1908 | Gemeny | 30/90.6 |
|---|---|---|---|
| 1,688,729 | 10/1928 | Mead | 81/428 R X |
| 2,777,345 | 1/1957 | Reider | 81/428 R X |
| 3,914,864 | 10/1975 | Prince | 30/90.6 |

FOREIGN PATENT DOCUMENTS 1,046,133  12/1958  Germany ............................ 81/9.5 B Primary Examiner—James L. Jones, Jr.
Assistant Examiner—James G. Smith
Attorney, Agent, or Firm—Kinzer, Plyer, Dorn & McEachran

[57] ABSTRACT

A wire stripper is constructed with an improved pivot, lever guide, spring bias and spring support.

8 Claims, 5 Drawing Figures

WIRE STRIPPER

This invention relates to a wire stripper tool for removing a sleeve-like section of insulation from a piece of wire.

U.S. Pat. No. 3,914,864 discloses a wire stripper in which there are three blades supported on a cutting head in opposed relation to an anvil. Two of the blades are supported in parallel relation on the sides of the cutting head and have their cutting edges extended normal to the wire positioned in a seat between the cutting head and anvil. By rotating the tool two circumferential slits can be made in the insulation, defining a sleeve-like section to be removed. This section is removed by repositioning the wire to a second seat so it lies opposite the third blade which is located at the front of the head. The third blade is used to slit the previously sectioned insulation longitudinally whereby the sleeve-like section may be removed by peeling it off after making the longitudinal slit.

In the known tool the cutting head and anvil are respectively presented by a pair of opposed arms pivotally mounted on the coil of a torsion spring which normally biases the cutting head to a closed position relative to the anvil. The arms are guided by a pair of spaced flanges secured to the outside of one arm and embracing the sides of the other.

The known tool performs satisfactorily in some instances but in the instance of large diameter wires there can be unsatisfactory performance; indeed, both incomplete and irregular slits are encountered so that easy peel-back is not realized. Close examination revealed that large diameter wires were causing the arms to shift longitudinally on the spring coil, that the guide flanges could not be fitted with sufficient precision to properly confine the arms for parallel movement and that the torsion spring did not consistently apply sufficient force to hold the large diameter wire.

The objects of the present invention are to achieve more certainty in the performance of the known tool and to reduce the likelihood of incomplete or irregular slits due to the spring coil being used as a pivot, due to the inability to achieve acceptable parallelism with a pair of guide flanges and due to the form of the spring in the known tool. Another object of the present invention is to overcome the deficiencies in the known tool by a construction which can be achieved at reasonable cost.

Figure 1:
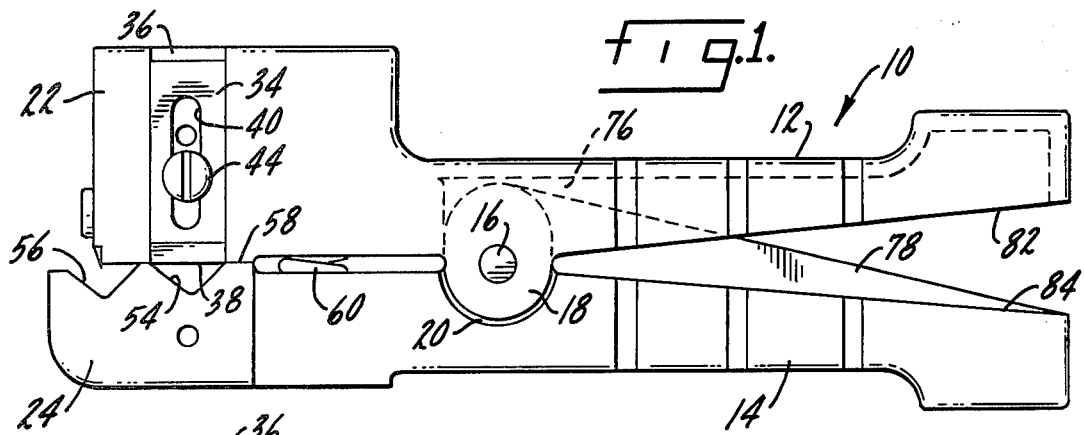
FIGS. 1 and 2 are side elevations of the tool showing, respectively, the closed and open position.
Figure 2:
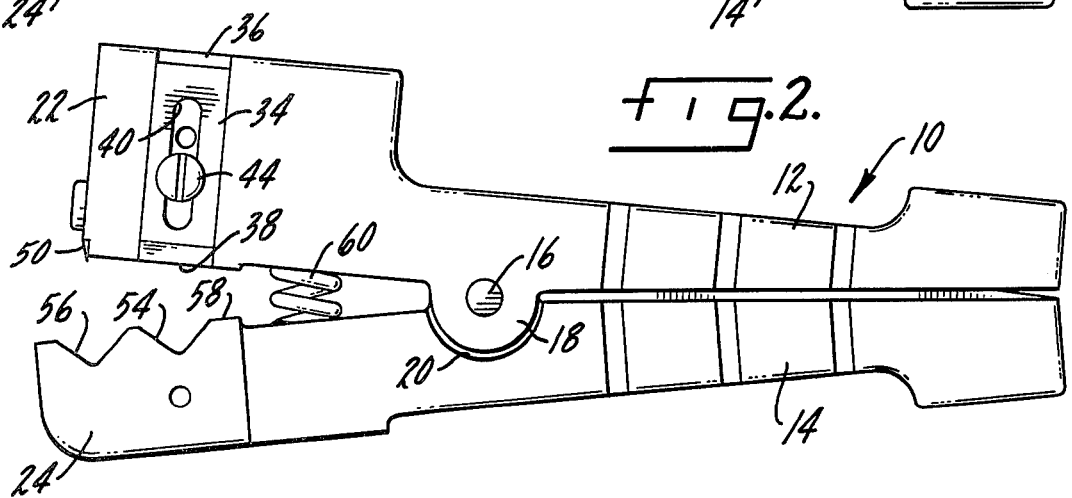
Figure 3:
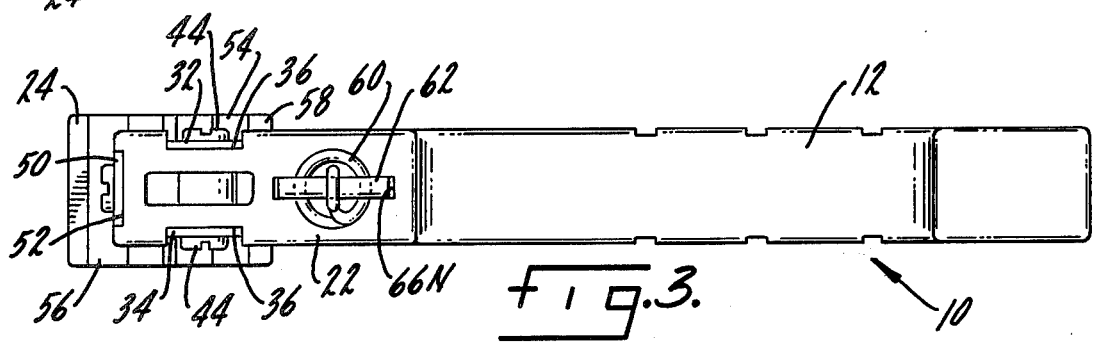
FIG. 3 is a top plan view of the tool.

The wire stripper tool 10 of the present invention comprises a pair of arms 12 and 14 joined by a pivot pin 16 intermediate the ends. To assure ample support for the pivot, the upper arm 12 is formed with a pair of lugs or ears 18 projecting downwardly therefrom and presenting curved surfaces which fit corresponding, complemental shaped recesses 20 in the lower arm 14.

The portion of the upper arm 12 which extends forwardly of the pivot 16 constitutes a cutting head 22 and the portion of the lower arm 14 opposed thereto constitutes an anvil 24. As will be explained in detail, the cutting head 22 supports three blades adapted to slit the insulation of a wire supported by the anvil 24.

Thus, a pair of cutting blades 32 and 34 are supported in spaced parallel relationship on the opposed sides of the cutting head 22. The sides of the cutting head 22 are recessed at 36 so that the respective cutting blades may be neatly nested therein with the lower knife edge 38 facing downwardly as viewed in the drawing.

Each blade has a longitudinally extending adjustment slot 40 formed therein. The flat head of a set screw 44 threadedly mounted in the cutting head 22 is employed to hold the cutting blade with its knife edge 38 in position properly to penetrate the insulation of the wire when the tool is used for stripping. What has been described with respect to the positioning and guiding of one blade is equally true of the other blade members.

A third cutting blade 50 is nested neatly in a mounting recess 52 at the fore end of arm 12. Its cutting edge is equal in length to the separation between the two blades 32 and 34.

The anvil 24, opposite the two blades 32 and 34 is provided with a long guide seat in the form of a notch 54 adapted to position and support an insulated wire with the axis of the wire extending normal to the knife edges of the two blades 32 and 34.

In like manner, a second seat 56 is located in the anvil opposite the cutting edge of blade 50.

The two blades 32 and 34 are first employed to make two circumferential slits in the insulation by rotating the tool about a wire disposed in the seat 54, the cutting edges being appropriately adjusted to penetrate the insulation completely, but no more. These two slits define a sleeve to be separated from the remaining portion of the wire and this is accomplished by repositioning the wire in notch 56 disposed opposite blade 50 and using blade 50 in a punching stroke to split the sleeve which may then be peeled off.

Figure 4:
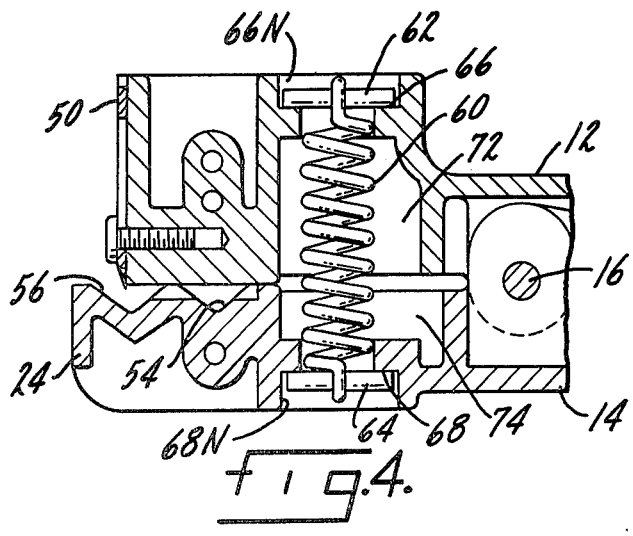
FIG. 4 is a detail in section.
Figure 5:
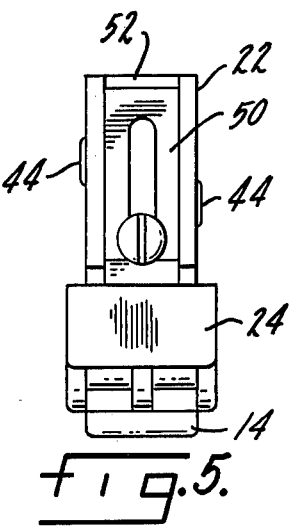
FIG. 5 is an end view of the tool.

The tool is spring biased to a closed position, that is, with the cutting head 22 closed on the anvil 24. This is accomplished by a strong coil spring 60 having its ends anchored on pins 62 and 64 respectively supported on internal shoulders 66 and 68 formed by appropriately notching (at 66N) the upper surface of the cutting head and the lower surface of the anvil (at 68N) in an area between the pivot 16 and the side cutting blades. Also, the interior of the cutting head has a large recess 72 communicating with a large internal recess 74 in the anvil, FIG. 4.

In the fully closed position, FIG. 1, a flat stop surface 58 on the cutting head engages an opposed surface on the anvil, although it can be viewed the other way.

The notches 66N and 68N closely confine the pins 62 and 64, that is, the notches are shaped complemental to the pins. The dimensioning and positioning are such that the spring 60 has its axis normal to the pivot axis and is quite close to the pivot 16 so that during opening and closing movement of the arms extension and compression of the spring will be quite near to linear.

As noted above the fully closed position is one where the stop surface 58 on the cutting head engages the opposed stop surface on the anvil; the knife edges are adjusted so that in the fully closed position the insulation, and no more, is penetrated. It will be noted seat 54 is at least as wide as the knife edge 38.

If the tool is to be used only for longitudinal slitting compared to removing an intermediate (peel-back) section of insulation, blade 50 may have a curved cutting edge.

To assure the blades 32 and 34 cut squarely to the axis of a wire in the seat 54, as well as to assure a truly axial slit by blade 50, arms 12 and 14 are provided on their opposed faces with a scissors-like guide in the form of a slot 76, FIG. 1, in the upper arm 12 and an opposed rib 78 projecting from the lower arm 14. Rib 78 is tapered, being thickest at the end near the pivot 16 and narrowing gradually in a rearward direction. Also, the opposed inside surfaces 82 and 84 of the arms are divergent rearwardly from pivot 16, allowing the arms to be squeezed toward one another to open the cutting head in the first place. Stress on the pivot pin 16 is relieved by the guide 76–78 when the arms are squeezed, which is to say that the guide means 76–78 prevents the arms from wobbling especially since the guide rib 78 is constantly in the guide slot regardless of the position of the arms 12 and 14, which preserves the pivot from undue wear.

It will be seen from the foregoing that as the arms 12 and 14 are squeezed together by manual force, the cutting head is moved to an open position compared to anvil 24, allowing the wire to be positioned in seat 54; spring 60 is extended so that the cutting head closes under spring pressure when the manual force is relaxed. When the cutting head is fully closed, the insulation is completely punctured by the knife edges of blades 32 and 34 and upon rotating the tool two circumferential slits are completed by blades 32 and 34. There is no wavering of an order preventing the tail end of the slit meeting the start of the slit to complete a true 360° slit because of the guide 76–78; by the same token, guide 76–78 prevents the arms 12 and 14 from wobbling on pivot 16.

What is claimed is:

1. In a wire stripper tool having a pair of arms connected at a pivot intermediate the ends thereof, one arm having an anvil at one end and the other arm having an opposed cutting head which supports a blade at the front of the head for slitting the wire insulation longitudinally, and a blade at each side of the head for slitting the insulation circumferentially, and wherein the anvil has a seat extending normal to the second-named blades for positioning the wire while being slit:

spring means located between the pivot and the cutting blades and normally biasing the cutting head to a closed position relative to the anvil;

said arms having opposed inner surfaces which are divergent rearward of said pivot to enable the arms to be squeezed together rearward of the pivot thereby to move the cutting head to an open position relative to the anvil which allows a wire to be positioned in the seat for slitting; and said inner surface of one arm being slotted and the inner surface of the arm opposed thereto having a guide rib with one end disposed in both the slot in the open and closed position of the cutting head.

2. A wire stripper according to claim 1 wherein the spring means is a coil spring having its axis substantially normal to the pivot axis.

3. A wire stripper according to claim 2 wherein the coil spring has its ends anchored to pins respectively seated in complemental notches in the cutting head and anvil.

4. A wire stripper according to claim 1 wherein the seat related to the second-named cutting blades is a recess in the anvil at least as wide as the cutting blade.

5. A wire stripper according to claim 4 wherein the cutting head and anvil having opposed stop surfaces engaged with one another in the fully closed position of the cutting head relative to the anvil.

6. A wire stripper according to claim 5 wherein the spring means is a coil spring having its axis substantially normal to the pivot axis.

7. A wire stripper according to claim 6 wherein the coil spring has its ends anchored to pins respectively seated in complemental notches in the cutting head and anvil.

8. A wire stripper according to claim 1 wherein the guide rib is tapered, being thickest at the end near the pivot.

* * * * *